United States Patent [19]

Louth

[11] 4,152,734

[45] May 1, 1979

[54] AUTOMATIC TRACKING FOR A PLAYBACK TRANSDUCER

[75] Inventor: Kenneth Louth, Portola Valley, Calif.

[73] Assignee: Ampex Corporation, Redwood City, Calif.

[21] Appl. No.: 779,855

[22] Filed: Mar. 21, 1977

Related U.S. Application Data

[63] Continuation-in-part of Ser. No. 668,582, Mar. 19, 1976, abandoned.

[51] Int. Cl.² .................... G11B 21/04; G11B 21/10
[52] U.S. Cl. .................................. 360/70; 360/73; 360/77
[58] Field of Search ................ 360/69, 70, 71, 75, 360/77, 73

[56] References Cited

U.S. PATENT DOCUMENTS

| | | | |
|---|---|---|---|
| 3,126,535 | 3/1964 | Streeter | 360/77 |
| 3,582,541 | 6/1971 | Hebb | 360/70 |
| 3,585,291 | 6/1971 | Yamakawa | 360/70 |
| 3,663,764 | 5/1972 | Trost et al. | 360/70 |
| 3,764,755 | 10/1973 | Yamashita | 360/70 |
| 3,905,043 | 9/1975 | Frank | 360/70 |
| 3,943,565 | 3/1976 | Frank et al. | 360/70 |

*Primary Examiner*—Raymond F. Cardillo, Jr.

*Attorney, Agent, or Firm*—Robert G. Clay; Ralph L. Mossino

[57] ABSTRACT

A method and apparatus is disclosed for use in a record/playback system for providing improved alignment between a transducer and a track on a recording medium on which track information has been recorded. The direction and magnitude of any misalignment between the transducer and the track is represented by an error signal. When the error signal indicates substantial alignment between the transducer and the track, a train of equally spaced pulses is generated. When the error signal indicates misalignment between the transducer and the track, at least one pulse is either added or deleted from the train of pulses, depending on the direction of misalignment indicated by the error signal. The pulse train is then used to generate a drive signal for effecting relative motion between the transducer and the track, the phase of the drive signal varying in response to the addition or deletion of pulses from the pulse train. The drive signal has a constant phase when the pulses are equally spaced, and has its phase altered in one of two selected directions when pulses are either added or deleted from the pulse train. By thus varying the phase of the drive signal, alignment between the transducer and the track is improved.

32 Claims, 16 Drawing Figures

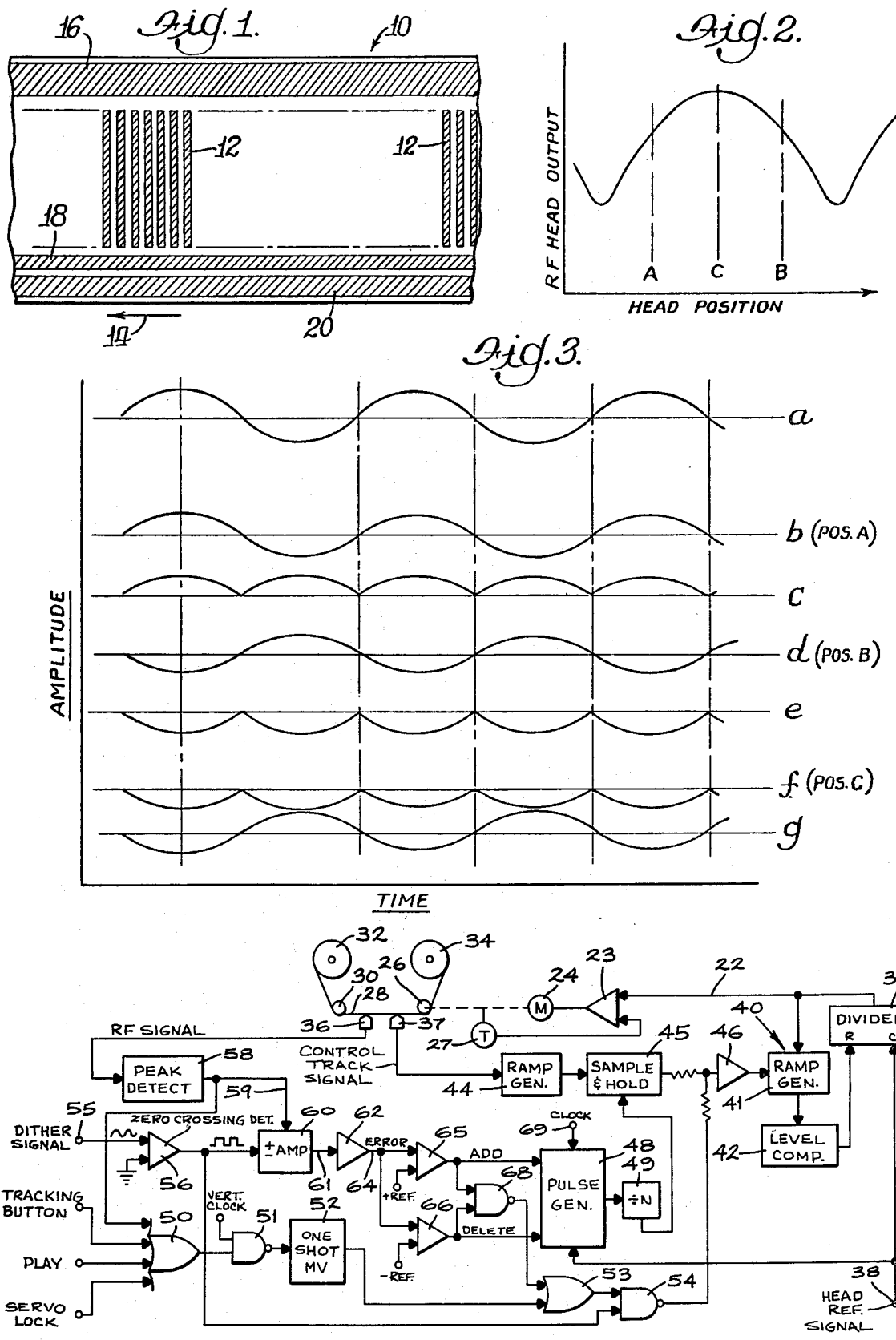

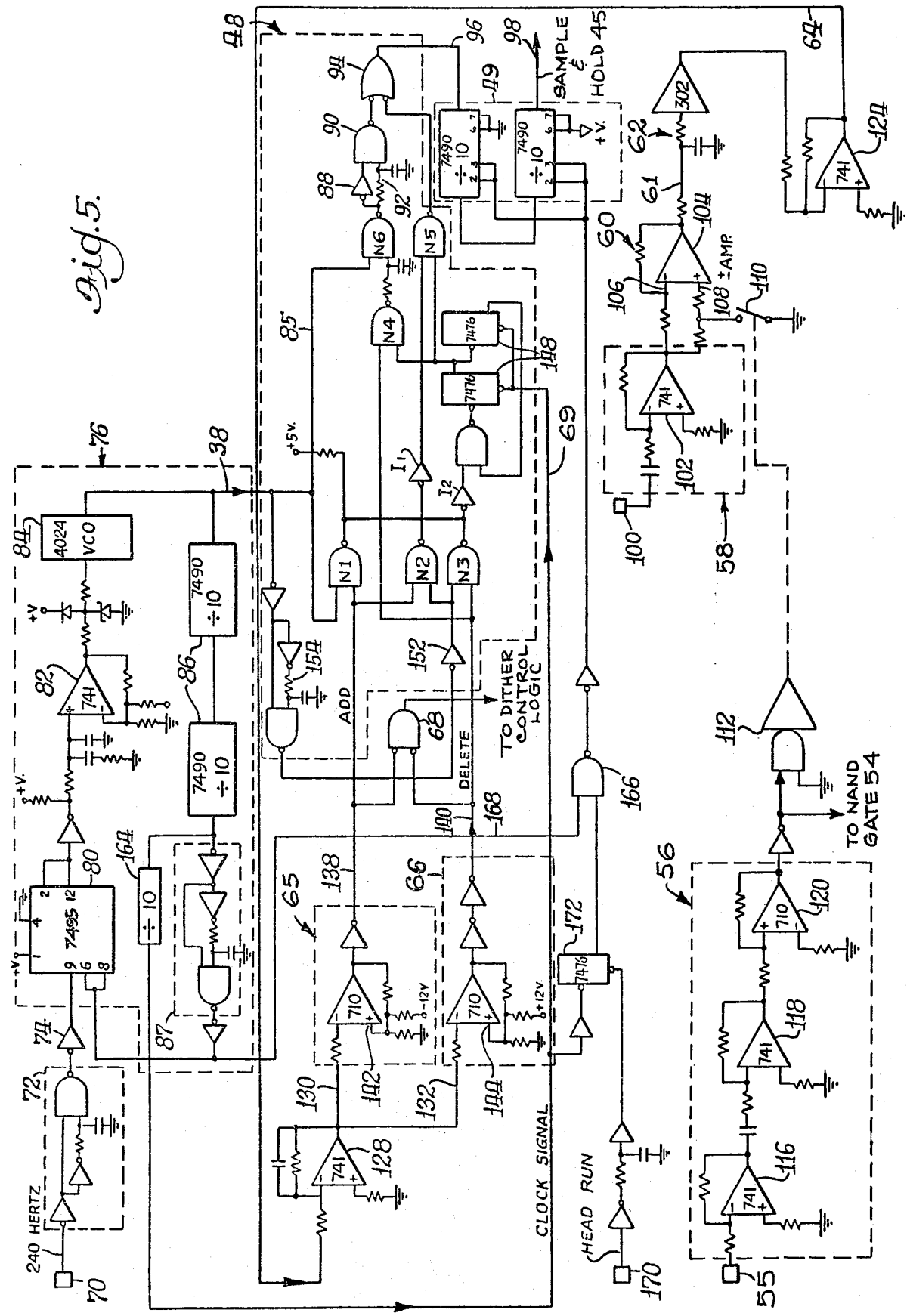

| | N1 | N2 | N3 | N4 | N5 | N6 | I₁ | I₂ | FF |
|---|---|---|---|---|---|---|---|---|---|
| ADD HIGH & DELETE LOW | 1 | 1 | 0 | 0 | 1 | 1 | 1 | 1 | 1 |
| DELETE HIGH & ADD LOW | 0 | 0 | 1 | 1 | 0 | 0 | 0 | 1 | 1 |
| ADD & DELETE LOW | 0 | 0 | 0 | 0 | 0 | 1 | 0 | 0 | 0 |

AUTOMATIC TRACKING FOR A PLAYBACK TRANSDUCER

This application is a continuation-in-part of my prior application Ser. No. 668,582, filed Mar. 19, 1976 and now abandoned.

This invention relates generally to record/playback systems and more particularly, to a method and apparatus for automatically aligning a transducer of such a system with a track on a recording medium on which track information has been previously recorded. An example of such a system is a videotape recorder in which information is recorded on information tracks on a videotape by a scanning transducing head. To reproduce the information from a particular track, a transducing head moves across the videotape along the path of the original track and generates an electrical signal representative of the information recorded on the track. For the best reproduction of the recorded video, the transducing head should be centered on the track being read. When a head is not centered on the desired track, the head is said to be not "tracking", and the quality of the signal suffers because of the misalignment. It is therefore advantageous to be able to determine when a transducing head is not properly tracking.

A known method of determining when a read head is properly tracking is to fluctuate or "dither" the speed of the tape which passes under the read head. In this manner the head position relative to the desired track is continuously varied and the amplitude of the head output varies accordingly. For example, when the head passes through the center of a track the output of the head is maximum. As the head moves to either side of track center, the output of the read head diminishes. By dithering the tape at a fixed rate, the output of the head is caused to be amplitude modulated at the dither frequency and the modulated head output therefore contains information regarding the position of the head relative to the track. This information can be detected and used to automatically reposition the tape so that the head is centered on the desired track. Conventionally, the dither of the tape has been used to provide a closed loop feedback correction scheme which has necessitated continuous use of the dither even after the initial correction has been made.

In a quadruplex format videotape recording apparatus for which the present invention is particularly well suited, the videotape has a width of approximately two inches and the video information tracks run generally perpendicularly of the lengthwise dimension of the tape. Such tapes have the audio tracks and control tracks extending in the lengthwise direction of the tape and along the edges thereof. Four record/playback video heads are mounted on a rotatable head wheel at 90° with respect to each other. This wheel is rotated at 240 revolutions per second (for the NTSC standard used in the United States) and is situated with respect to the tape such that the heads contact and move across the tape in a direction generally perpendicular to the lengthwise dimension of the tape. The information in the audio and control tracks is sensed by separate stationary heads which overlie their respective tracks.

When the quadruplex videotape recordings incorporate the tape dithering described above, the speed of the tape fluctuates in the direction of the audio track. The output of the audio head becomes distorted because the audio head converts the speed fluctuations into frequency fluctuations in the reproduced audio. The video head does not experience this problem since its speed in the direction of the video tracks does not change. Thus, even though it is desirable to dither the position of the videotape with respect to the video head in order to generate a correction signal for properly aligning the tape with the head, it is also desirable to avoid the resultant degradation of the reproduced audio. The degradation of the audio is quite apparent to broadcasters and many have simply refused to use such closed loop, continuous dither automatic tracking systems because of the audio degradation and have resorted to a manual adjustment.

Accordingly, it is an object of this invention to provide an improved method and apparatus for accurately aligning a recorded track on a recording medium with one or more transducers during playback.

It is another object of the present invention to provide an improved method and apparatus for accurately aligning the recorded tracks on a videotape with one or more transducing heads during playback.

Another object of this invention is to provide a method and apparatus for detecting tracking errors and for correcting and maintaining the alignment of the transducing heads relative to the video tracks without unduly degrading the reproduced audio.

Other objects and advantages of this invention will become apparent upon reading the following detailed description, while referring to the attached drawings, in which:

FIG. 1 illustrates a portion of a videotape having a number of recorded information tracks thereon;

FIG. 2 is a graphical illustration of the output of a video transducing head as a function of its alignment with a video track;

Figures 6, 7:
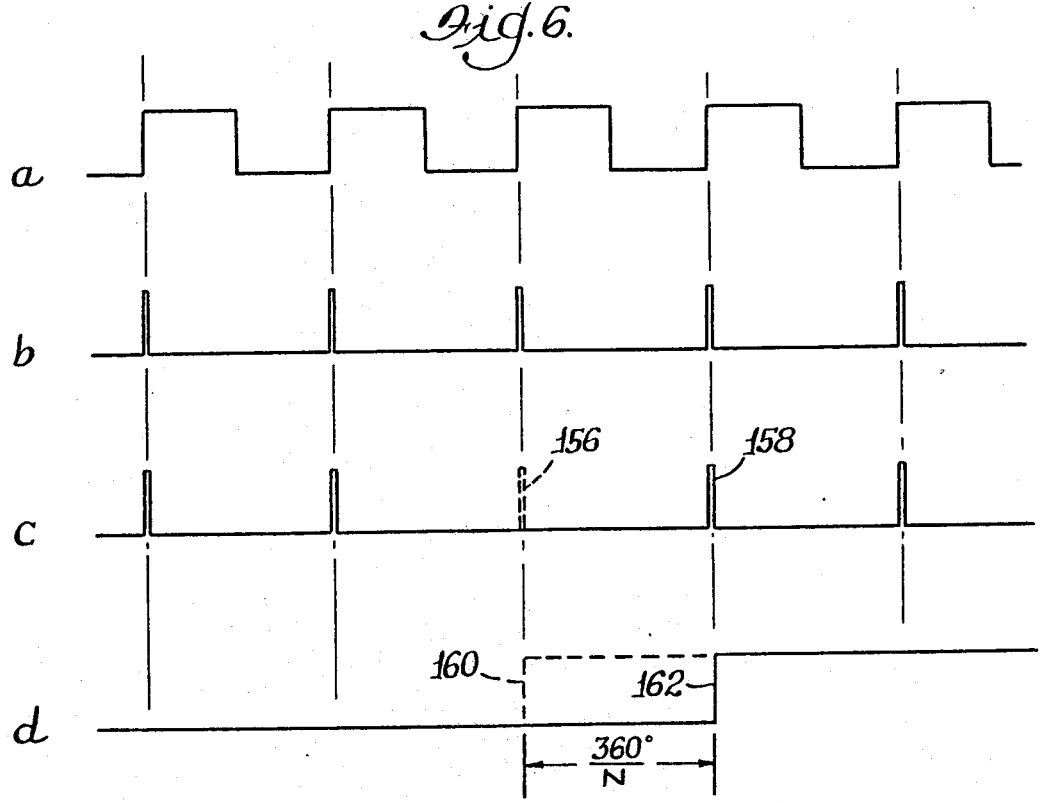

FIG. 3, a-g, shows a number of waveforms useful in explaining the operation of this invention;

FIG. 4 is a block diagram of an automatic tracking system embodying various aspects of this invention;

FIG. 5 is a schematic diagram of the tracking system shown in FIG. 4;

FIG. 6, a-d, shows a number of waveforms useful in explaining the operation of the automatic tracking system shown in FIGS. 4 and 5; and FIG. 7 is a truth table for a portion of the circuitry shown in FIG. 5.

Broadly stated, this invention is directed to a method and apparatus for automatically aligning a transducer with a track on a recording medium on which track information has been recorded. This invention is particularly useful for automatically aligning a recorded track on a videotape with a video transducing head without substantially degrading the reproduced audio. Automatic alignment of a head with a track is effected by sensing the relative position of the track and the head, correcting for any misalignment which is sensed, terminating the alignment correcting process, and thereafter maintaining the corrected alignment. Since the alignment correcting process occurs automatically and lasts for a relatively short time, the audio is not substantially degraded since the alignment correcting process which degrades the audio is terminated after correct alignment is achieved.

In one embodiment described herein, the degree of misalignment between a recorded track on a videotape and a transducing head is sensed by selectively dithering the tape in order to amplitude modulate the output of the head with a tracking signal, detecting the tracking signal and generating an error signal therefrom representative of the misalignment between the track and the head. If the error signal exceeds a predetermined level, the phase of the capstan drive signal is altered by a discrete phase increment to move the tape in a direction which improves alignment between the track and the head. When alignment is substantially achieved, the dither is terminated so as not to thereafter affect the reproduced audio.

The improvement which this invention effects may be better understood by first considering a videotape of the type used in Quadraplex videotape recorders. A portion of such a tape is shown generally at 10 in FIG. 1. The various shaded areas on the tape 10 represent tracks on which information has been recorded. The tracks 12 which extend transversely to the lengthwise dimension of the tape 10 are video tracks which are recorded by one or more rotating transducing heads contacting the tape along the paths described by the tracks 12. Usually, there are four heads on a rotating drum, the four heads being located 90° apart from each other. While the drum rotates, a capstan (not shown) receiving a capstan drive signal pulls the tape past the heads in a direction shown by the arrow 14. A longitudinally extending audio track 16 is provided along an edge of the tape 10 for recording the audio portion of a television program, for example. The audio track 14 is usually recorded by a stationary audio head which overlies that portion of the tape indicated as the audio track 14.

Another pair of tracks 18 and 20 extend lengthwise of the tape 10 and are also located near one edge of the tape. The track 18 is usually referred to as a cue track and is a second audio track which can be used for commentary, sound in a foreign language, or other purposes. The track 20 is referred to as a control track and is required for recording a synchronizing signal for use of the videotape recorder itself. During the record process, a 240 hertz sine wave is recorded longitudinally on this track and on playback, the control track signal is used to control the tape position.

In reproducing the video information recorded on the video tracks 12, it is important that the transducing head or heads (not shown) be centered over the track being "read". When the reading head is not so centered, the tape and head are said to be not "tracking" perfectly and under imperfect tracking conditions the video may not be reproduced with the desired degree of accuracy or with the desired signal to noise ratio.

To determine when a read head is not tracking perfectly, some videotape recorders have included apparatus for selectively "dithering" the tape, i.e., causing the speed of the tape to rapidly fluctuate in a periodic fashion so that the speed of the tape alternately increases and decreses relative to its average speed in the direction of the arrow 14 in FIG. 1. When the speed of the tape 10 is dithered, the resultant relative motion between the video track being read and the read head will cause the head to scan back-and-forth across a track 12. This relative motion will cause the RF output of the head to vary as the position of the head varies relative to the track. This variation in head output as a function of its position is shown in FIG. 2. When the head is centered over a track 12 as indicated by position C in FIG. 2, the output of the head is maximum. When the head is off-center with respect to a track 12 as indicated at positions A and B, the output of the head is reduced. The minimum head output occurs when the head is between adjacent tracks 12.

When the tape 10 is dithered at a fixed frequency, the RF output of the head becomes amplitude modulated at the dithering frequency, the envelope of the modulated output containing information regarding the head tracking. This envelope can then be detected to form a tracking signal indicative of the degree of alignment between the head and the track being read.

Examples of tracking signals developed by a head at various degrees of alignment with a track 12 are shown in FIG. 3. Waveform b illustrates a tracking signal developed when a video-tape is dithered at a frequency represented by the dithering signal in waveform a and when the head is at position A of FIG. 2. The phases of waveform b and the other waveforms of FIG. 3 are drawn with the assumption that the tape first moves to the right in FIG. 2. As shown in FIG. 3, waveform b varies approximately sinusoidally at the frequency of the dithering signal (waveform a). When the head is at position B of FIG. 2, the tracking signal can be represented as waveform d. Waveform d differs from waveform b in that its phase differs from the phase of waveform b by 180 degrees. When the head is at position C of FIG. 2, the tracking signal can be represented as waveform f of FIG. 2 and has, as illustrated, an envelope which resembles a fully rectified sine wave.

In the automatic tracking system described below, an error signal is developed from the tracking signal for controlling the automatic alignment of the head with a track. The development of the error signal is effected, in part, by inverting every other half cycle of the tracking signal. For example, when every other half cycle of waveform b is inverted, waveform c is developed and has a positive polarity. When this operation is performed on waveform d, waveform e is developed and has a negative polarity. The result of inverting alternate half cycles of waveform f is shown as waveform g which has an average value of zero. Thus, the direction of misalignment of a head with respect to track center can be determined from the polarity of the error signal and the extent of magnitude of the misalignment can be determined from the magnitude of the error signal.

The automatic tracking system described below has two modes of operation, an open loop mode and a closed loop mode. In the closed loop mode, the videotape is dithered as described above and tracking signals such as those shown by waveforms b, d and f of FIG. 3 are developed. The tracking signals are converted to error signals representative of the direction and magnitude of the misalignment of the head relative to a track. The error signals are then used to alter the phase of the capstan drive signal by a discrete phase increment so as to improve the alignment between the video track and the head. When substantial alignment is achieved as indicated, for example, by a substantial decrease in the amplitude of the error signal, the closed loop mode of operation is terminated and the open loop mode of operation is begun.

In the open loop mode, the dither is terminated and no further alterations are made in the capstan drive signal. However, because of the inherent memory of this automatic tracking system, the altered phase of the capstan drive signal is maintained in the open loop mode so as to maintain the improved alignment between the video track and the head. Normally, this system operates in the closed loop mode for only a short interval, after which the system switches to the open loop mode and stays in the open loop mode until a loss of tracking is sensed, due for example to creases in the tape, a poor edit, etc. or the recorder servos become unlocked or the recorder operator manually calls for a tracking verification. Therefore, the audio which is reproduced does not suffer degradation due to dither occurring after tracking has been improved, which is the condition the system is in most of the time.

A method of effecting automatic tracking is schematically illustrated in FIG. 4. The particular system shown in FIG. 4 is directed to Quadraplex videotape recorders designed for the U.S. television format, but the invention is not limited to such an environment.

The system generates a capstan drive reference signal in a manner described hereinafter which signal appears at conductor 22. The capstan drive reference signal is in the form of a rectangular wave and is applied to a comparitor and motor drive amplifier 23 for driving a motor 24 which mechanically rotates a tape capstan 26. The capstan 26 pulls a videotape 28 around a roller 30 between reels 32 and 34. The rotation of the capstan 26 is sensed by a tachometer 27 which develops a feedback signal representative of the instantaneous angular position of the capstan 26. The angular position of the capstan 26, and also the position of the tape 28, is controlled by feeding back the output of the tachometer 27 to the comparator and motor drive amplifier 23 which compares the tachometer output with the capstan drive reference signal and applies to the motor 24 a signal which effectively brings the capstan 26 to the angular position called for by the capstan drive signal. The bandwidth of the above-described capstan drive servo loop is relatively narrow so therefore the rectangular wave is substantially a sine wave as applied to the motor 24.

A video read head 36 contacts the tape 28 and senses the information recorded on the video tracks. This information is then fed to video processing circuitry (not shown) which processes the video information from the head 36. The video processing circuitry is not related to this invention and has, therefore, not been included in FIG. 4. The illustrated tape drive mechanism is shown in very simplified form and may take other forms. Also, although only one video read head 36 is shown, it is understood that Quadraplex video tape recorders generally include four such heads.

The capstan drive reference signal at conductor 22 is generated by circuitry which includes a secondary capstan servo loop which compares the longitudinal position of the tape 28 which is sensed by a control track head 37 playing back the recorded control track signal, with the angular position of the rotating head 36 which is indicated by a head reference signal 38 provided by a read head tachometer (not shown). More particularly, the head reference signal 38 which is in the form of a square wave having a frequency of N×240 hertz, where N is an integer is applied as a clock signal to the input of a divider 39, which is a conventional counter. The divider 39 provides an output pulse to the motor drive amplifier 23 after counting a predetermined number of pulses in the clock signal 38. The divider 39 is reset by a controllable time delay circuit 40 which varies the start of the count in accordance with an error signal. The time delay circuit 40 includes a ramp generator 41. The output pulse of the divider 39 applied to the ramp generator initiating a ramp which is sampled by the error signal. This sample is coupled to a level comparator and pulse generator 42 which generates the reset pulse. Thus variations in the timing of the error signals varies the timing of the capstan drive signal 22.

As shown in FIG. 4, the error signal during normal operation is generated by coupling the control track signal to a ramp generator 44. The ramp generated by the ramp generator 44 is sampled by a tracking error signal in a sample and hold circuit 45 and the output of sample and hold circuit is applied through a summing amplifier 46 to the ramp generator 41.

In the open loop mode previously described, the timing of the tracking error signal remains constant. This tracking error signal is generated by a pulse generator 48, which in response to the head reference signal applied thereto, generates a train of periodic control pulses having a repetition frequency equal to N × 240 hertz. The control pulses from generator 48 are used to step a divide-by-N divider 49 which delivers an output, preferably in the form of a rectangular wave, on receipt of every Nth pulse from generator 48. The output of divider 49 is the tracking error. Thus, in the open loop mode, no alignment of the video tape 28 is attempted, the tape 28 is not dithered, and the audio is faithfully reproduced. The open loop mode of operation merely converts the head reference signal at terminal 38 to a tracking error signal of the same timing at the sample and hold circuit 45.

The closed loop mode of operation is typically initiated either when the videotape recorder is first set up to replay a tape and the operator pushes a "play" button, or when the RF output of the read head decreases to the point where a loss of tracking is indicated or when a tracking button is pressed by the operator or when the servo systems become unlocked. In each case, the videotape is dithered so as to amplitude modulate the output of the video read head 36. More particularly, when the play button is depressed, a signal is applied through an OR gate 50 to one input of a NAND gate 51. A vertical sync clock pulse is applied to the other input of the NAND gate, the output of which is connected to a one shot multivibrator 52. The output of the one shot multivibrator 52 is coupled to one input of an OR gate 53, the output of which is coupled to a NAND gate 54. Also coupled to NAND gate 54 is a dither signal 55, which has been converted into a square wave by a zero crossing detector 56. Thus, each time the one shot multivibrator 52 is actuated by the vertical clock pulse the dither signal is applied to the input of the summing amplifier 46. This causes the control track error signal to vary in accordance with the dither signal which, in turn, causes the tape to be dithered. Likewise, the dither signal is coupled to the summing amplifier 46 when the tracking button is pressed or the servos become unlocked. In addition, the dither signal is coupled to the summing amplifier 46 when the RF envelope of the signal reproduced by the head 36 decreases below a predetermined level. This decrease in level is sensed by a peak detector 58, the output of which is applied to the OR gate 50.

When the tape is dithered, the amplitude modulated output of the head 36 is detected by the peak detector 46 to generate a tracking signal at conductor 59. This tracking signal is of the type indicated by waveforms b, d and f of FIG. 3 and is representative of the position of the head 36 with respect to a video track.

In order to convert the tracking signal to an error signal for controlling the re-alignment of the tape 28, a ± amplifier 60 receives the tracking signal at conductor 59 and a switching signal at conductor 60 for alternately switching the ± amplifier 60 between an inverting mode and a non-inverting mode. The alternate switching of the ± amplifier 60 is affected at the dither frequency in order to invert every other half cycle of the tracking signal so as to produce at conductor 61 a signal such as those shown by waveforms c, e and g of FIG. 3.

The switching signal at conductor 60 is generated by the zero-crossing detector 56 which receives the sinusoidal dither signal 55. The frequency of the sinusoidal dither signal is equal to the frequency at which the tape 28 is dithered. The signal at conductor 61 is integrated by integrator 62 to generate a DC error signal at conductor 64. When the head 36 is centered on a track on the tape 28, the output of integrator 62 will be approximately zero volts DC. When the head 36 is off-center of a track in one direction, the DC error at conductor 64 will have a positive polarity, and when the head 36 is off-center in the opposed direction, the polarity of the DC error at conductor 64 will be negative.

In order to determine whether there is an error signal on conductor 64 and what the direction is of any misalignment between the head 36 and a track on tape 28, a pair of voltage comparators 65 and 66 receive both the error signal and a reference voltage to which the error signal is compared. Comparator 65 compares the error signal to a positive reference voltage and develops no output when the error voltage either has an amplitude which is less than that of the reference voltage or has a negative polarity. When the error signal is more positive than the positive reference voltage, comparator 65 generates at its output an ADD signal which is used to correct the alignment of the tape 28 with respect to the head 36 in a manner to be described below. Comparator 66 compares the error signal to a negative reference voltage and, when the error signal is smaller in amplitude than its reference voltage or has a positive polarity, the output of comparator 66 is zero. When the error signal is more negative than the negative reference voltage, comparator 66 generates at its output a DELETE signal also for use in altering the alignment of the tape 28.

The ADD and DELETE signals, or the absence thereof, is sensed by a NAND gate 68 which is opened by an absence of both the ADD signal and the DELETE signal. The absence of both signals indicates that the head 36 is centered on a track and that no tracking corrections are necessary. Under those conditions the NAND gate 68 is opened and its output which is applied to the OR gate 53 to thereby close the NAND gate 54 and kill or terminate the dither of the tape 28. When either the ADD or DELETE signal is present the NAND gate 68 remains inactivated and the ADD and DELETE signals are acted upon by the pulse generator 48 in a manner now to be described.

As pointed out above with respect to the open loop mode, the pulse generator 48 generates a train of periodic pulses whose repetition frequency is equal to N × 240 hertz. In the closed loop mode of operation, the pulse generator 48 continues generating a train of pulses but, in addition, adds an extra pulse to its output when it receives an ADD signal and deletes one pulse from its train of pulses when it receives a DELETE signal. The rate at which the pulse generator 48 adds and deletes pulses from its pulse train is determined by a clock signal received by pulse generator 48 from terminal 69. For example, when the clock rate is 24 hertz, the pulse generator 48 will add or delete one pulse every one twenty-fourth of a second. The addition and deletion of pulses from the pulse train generated by the pulse generator 48 has the effect of altering the phase of the tracking error signal at the output of the divider 49 by discrete phase increments so as to improve the alignment between the head 36 and a track on the tape 28. One way in which the alteration of the phase of the tracking error signal may be effected is described in detail below in connection with a description of circuitry which embodies the system illustrated in FIG. 4. Briefly, however, the alteration in the phase of the tracking error signal which occurs when a pulse is added or deleted from the pulse train results from the way in which the divider 49 generates its output. For example, when N equals 20, the divider 49 will count twenty pulses and then generate an output. If the next successive pulse is deleted, the counter will begin counting again on what would have normally been the second pulse (the first pulse was deleted) and will count up to twenty on what would normally have been the twenty-first pulse before generating another output. The result is that the output of the divider 49 is delayed by one period of the N × 20 hertz pulse train. If the period of the output from the divider 49 is equated to 360°, the net phase change in the capstan drive signal which results from the deletion of one pulse is 360° divided by N. If a phase increment of 360° divided by N is not enough to properly align the tape 28, an error signal will continue to be generated and pulses will continue to be deleted at a rate corresponding to the frequency of the clock signal at terminal 69 until the tracking error has been eliminated. Similarly, when a pulse is added to the train of pulses from the generator 48, the divider 49 will count to twenty sooner than it ordinarily would have and will generate an output whose phase is shifted in the opposite direction by 360° divided by N. Thus, the value chosen for N determines the smallest phase increment by which the tracking error signal is altered. If N is made as large as fifty, the phase increments will be 360 divided by 50 and will begin to approach the size of phase errors which occur naturally in a videotape recorder. In that case, the desired phase increments are indistinguishable from the naturally occurring phase errors and may not produce the desired realignment of the tape. In a Quadraplex videotape recorder, an N of 20 was found to be effective.

Referring now to the FIG. 4 system again, the ADD or DELETE signals continue to be generated and the phase of the tracking error signal continues to be altered at a rate dependent on the frequency of the clock signal until the alignment between a track on the tape 28 and a head 36 is so good that the error signal on conductor 64 is reduced in amplitude to the point where it is smaller than the reference voltages applied to the comparators 65 and 66. At that time, the comparators 65 and 66 will generate no ADD or DELETE signals and NAND gate 68 will sense the absence of ADD and DELETE signals and will terminate the dither. With the dither off and with the head 36 aligned with the center of a track on the tape 28, no tracking signals are generated and the system switches to the open loop mode. Because of the way in which the pulse generator 48 and the divider 49 operate, which is described in more detail below, the altered phase of the tracking error signal is maintained in the open loop mode so that the improved alignment is also maintained. The open loop mode will terminate when the output of the head decreases substantially due to a loss of tracking or the servos become unlocked or the tracking button is pressed and the dither will be re-established and the system will switch to the closed loop mode to correct the tracking.

The method of providing automatic tracking described in connection with FIG. 4 is effectively carried out by the circuitry shown in FIG. 5 wherein elements which also appear in FIG. 4 have the same reference numerals. In FIG. 5, various logic elements include commercial designations and, in some cases, the pin numbers are shown. Also, the logic circuitry is shown with the usual "bubbles" at various input and output terminals to indicate where the voltage is low when the inputs to the associate logic element are "true".

Referring now to FIG. 5, the circuitry will be described first in its open loop mode of operation. A 240 hertz input signal is applied to a terminal 70 from, for example, a tachometer (not shown) which senses the rotational speed of the head which rotates at 240 revolutions per second. The 240 hertz signal is applied to a pulse shaper 72 which generates an output pulse at one edge of the 240 hertz signal. The 240 hertz pulses are inverted by an inverter 74 and multiplied by a factor of 20 (N = 20) by oscillator 76. The output of the oscillator 76 appears at conductor 38 and is in the form of a 20 × 240 hertz reference square wave as shown at a in FIG. 6. Oscillator 76 is conventional and includes an up-down counter 80, an amplifier 82, a voltage controlled oscillator 84, a pair of divide-by-10 dividers 86, and a pulse forming network 87. The remaining components and the mode of operation of oscillator 76 are standard and well known in the art.

The 20 × 240 hertz signal at conductor 38 is coupled to the pulse generator 48 which operates on the positive-going edges of the 20 × 240 hertz square wave to generate a train of control pulses whose repetition frequency equals 20 × 240 hertz. To that end, the square wave signal at conductor 38 is coupled via conductor 85 to a NAND gate N6 whose other input is true during the open loop mode. The output of the gate N6 is coupled to a pulse forming network including an inverter 88, a NAND gate 90, and an RC time constant network 92 for generating a negative polarity pulse at every positive-going transition of the square wave. The negative polarity pulse is inverted by an OR gate 94 so that a train of positive polarity pulses appear at conductor 96. Waveform b of FIG. 6 illustrates the train of pulses appearing at conductor 96 and their relationship to the 20 × 240 hertz square wave (waveform a of FIG. 6).

The train of pulses generated by the pulse generator 48 is counted by a divide-by-20 counter 49 for generating a rectangular wave output which begins at every twentieth pulse received from the generator 48. The output of the divider 49, which appears at the terminal 98, is the tracking error signal which is applied to the sample and hold circuit 45. Thus, in the open loop mode, the 240 hertz signal at the terminal 70 is converted to a 240 hertz tracking error signal at the terminal 98.

In the closed loop mode, the videotape is dithered to generate a RF signal indicative of the instantaneous position of the head relative to the video tracks on the tape. The RF signal is received from the head 36 at terminal 100 and is applied to the peak detector 58 which includes a differential amplifier 102. The peak detector signal is converted to an error signal by the operation of the ± amplifier 60 which includes a differential amplifier 104 having an inverting input 106 and a non-inverting input 108, both of which receive the peak detected signal. A switch 110 is actuated at the dither frequency such that the non-inverting input 108 is grounded at the dither frequency. When the switch 110 is open, the ± amplifier 60 operates as a non-inverting amplifier with a gain of +1. When switch 110 is closed, the non-inverting input becomes grounded and the amplifier 60 operates as an inverting amplifier with a gain of −1. The overall effect is that every other half cycle of the tracking signal becomes inverted as shown, for example by waveforms c, e and g of FIG. 3.

The actuation of switch 110 is effected by an electronic switching device 112 which is driven by a square wave signal generated by a zero-crossing detector 56 comprising amplifiers 116, 118 and 120. Amplifier 116 receives a dither frequency sinusoidal signal at terminal 55 for generation of the square wave which actuates electronic switch 112.

The output of the ± amplifier 58 is averaged by the integrator 62 and amplified by an amplifier 124 to generate a DC signal at conductor 64. The conductor 64 couples this DC signal to another integrator 128 for averaging any noise components present in the DC signal. The output of the integrator 128 is the error signal at conductors 130 and 132, the amplitude and polarity of this error signal being representative of the magnitude and direction of any misalignment between the head and a video track on the tape.

The error signal present at conductors 130 and 132 is compared to reference voltages by the comparators 65 and 66 for generating ADD and DELETE signals at their output conductors 138 and 140. When the error signal present on conductor 130 is more negative than a negative reference voltage at an input 142, the comparator 65 generates a high output or ADD signal at the conductor 138. When the error signal at the conductor 130 is either positive or of smaller magnitude than the reference voltage at the input 142, the output of the comparator 65 is low and no ADD signal is generated. When the error signal present on the conductor 132 is more positive than a positive reference voltage at an input 144 of the comparator 66, the comparator 66 generates a high output or DELETE signal at the conductor 140. Otherwise, the signal at the conductor 140 is low and no DELETE signal is generated. Thus, in the closed loop mode, conductors 138 and 140 have either an ADD signal, a DELETE signal or neither. The simultaneous absence of both an ADD signal and a DELETE signal indicates proper alignment of the head with a video track and is sensed by the NAND gate 68 which actuates the NAND gate 50 for terminating the dither and returning the system to the open loop mode of operation.

In order to alter the phase of the capstan drive signal by adding or deleting pulses from the pulse train present at conductor 96, several conditions must be satisfied. One condition which must be satisfied is that a flip-flop 148 must deliver an output to provide a "window" during which pulses may be either deleted or added. The "window" is generated by flip-flip 148 when a clock signal is present on conductor 69, when either an ADD or a DELETE signal is present on the conductors 138 and 140, and when an inverter I2 is actuated. In order to actuate the inverter I2 when a DELETE signal is present a NAND gate N3 must receive a positive pulse from an inverter 152, which pulse is generated by a pulse forming network 154 at each negative-going transition of the 20 × 240 hertz signal at conductor 38. When these conditions are satisfied, the flip-flip 148 generates an output which, in combination with a DE- LETE signal on the conductor 140, actuates a NAND gate N4. The gate N4, in turn, turns off the gate N6 and inhibits the generation of a pulse by the pulse forming network 88, 90 and 92. The result of deleting a pulse from the train of pulses is indicated in FIG. 6 in waveform c where a pulse 156 has been deleted from the normal pulse train. If the pulse 156 would normally be the twentieth pulse in a train of pulses being counted by the divider 42 (which generates an output after every twentieth pulse) the deletion of pulse 156 will cause the divider 42 to count the next successive pulse 158 as the twentieth pulse and generate its output then. The effect of deleting the pulse 156 is shown in waveform d of FIG. 6 wherein the leading edge of the capstan drive signal, i.e., the output of divider 49 has been moved from 160 to 162. Since the pulses in waveform c occur at a rate of N × 240 hertz (N = 20), the tracking error signal is delayed by 360° divided by N. If the deletion of pulse 156 and the resultant phase shift of the tracking error signal is sufficient to bring the tape into proper alignment with the head, no more pulses will be deleted. However, the altered phase shift of the tracking error signal will be maintained since the divider 49 will continue to develop its twentieth count and its output one pulse later than it otherwise would have if pulse 156 had not been deleted.

The clock signal which appears on the conductor 69 (FIG. 5) determines the rate at which pulses will be added or deleted and is generated by a divide-by-10 divider 164. The divider 164 counts down from a 240 hertz signal at its input to deliver a 24 hertz clock signal at its output.

When the error signal on conductor 64 causes an ADD signal to be generated at the conductor 138, the gate N1 actuates an inverter I2 which, together with the clock signal, energizes the flip-flop 148 to create the "window" during which a pulse can be added. The pulse is added by feeding the pulses from the pulse forming network 154 through the inverter 152, gate N2 and the inverter I1, to a gate N5 which delivers the pulse to an OR gate 94 when the gate N5 receives the "window" pulse from flip-flop 148. The OR gate 94 passes this additional pulse to the divider 49 which then reaches its twentieth count sooner and therefore generates its output sooner. As a result, the tracking error signal at the terminal 98 has its phase altered by 360° divided by 20 in a direction which improves the alignment between the videotape and the head. Pulses will continue to be added in the manner described until the error signal at the conductor 64 drops below the reference voltage at the input 142 of the comparator 134, at which time the gate 68 will actuate the dither control logic and return the system to the open loop mode.

The conditions which exist in various elements of the pulse generator 48 during deletion and addition of a pulse are summarized in the truth table shown in FIG. 7 in which a "1" indicates that an element is receiving true inputs and a "0" indicates that an element is receiving untrue inputs.

When the videotape recorder is first energized, the head must come up to its nominal speed of 240 revolutions per second before the automatic tracking system can function normally. While the head is accelerating to its nominal speed the pulse generator 48 (FIG. 5) is bypassed by coupling pulses from the oscillator 76 to a gate 166 via a conductor 168. These pulses are applied to the divider 42 so that its output is in phase with the signal at the input terminal 70. When the head reaches its nominal speed of 240 revolutions per second, a positive head run signal appears at a terminal 170 and disables a flip-flop 172, thereby turning off the gate 166. Thereafter, the auto tracking system functions normally as described above.

The described method and apparatus provide automatic tracking in a videotape recorder for aligning video tracks on a videotape with a read head. The extent and direction of any misalignment between the head and the video tracks is sensed in a closed loop mode by dithering the tape to generate an error signal which then controls the direction and extent of phase corrections which are made to a capstan drive signal. The corrected capstan drive signal then causes the tape to be brought into improved alignment with the head. When proper alignment is thus achieved, the system switches to an open loop mode of correction wherein tape dithering is discontinued so as not to degrade the reproduced audio. The phase corrections applied to the capstan drive signal in the closed loop mode are maintained in the open loop mode to maintain the degree of tracking correction achieved. Accordingly, this method and apparatus overcomes the difficulties of known videotape systems which continuously dither the tape to achieve proper tracking and thereby continuously degrade the reproduced audio. The dithering effected in this method continues for only a short period of time while tracking corrections are being made and is thereafter terminated, thereby permitting the audio to be more faithfully reproduced.

The above-described method and apparatus are particularly useful with Quadraplex videotape recorders and have been specifically illustrated in that environment. However, this invention is also useful with other record/playback systems where alignment of a transducer with a recording medium is important. For example, the playback head of an audio tape system may be aligned with the audio tape according to this invention. Also, in a system where a laser transducer must be accurately aligned with tracks on a disc, the method described herein is applicable. Other obvious modifications and variations in the specific embodiments described herein will also be apparent to those skilled in the art. Accordingly, the present invention is intended to include all such modifications and variations which fall within the spirit and scope of the invention as defined by the appended claims and equivalents thereof.

Various features of the invention are set forth in the following claims.

What is claimed is:

1. In a videotape recorder having a videotape driven by a capstan receiving a capstan drive signal and having at least one video read head for generating an electrical signal representative of information recorded on video tracks on the tape, a method of detecting and correcting tracking errors between the video tracks and the video read head, without substantially degrading audio reproduced from an audio track on the tape, comprising:

dithering the video tape to amplitude modulate the output of the video read head with a tracking signal representative of the position of the head with respect to a video track;

detecting the tracking signal and developing therefrom an error signal representative of the direction and magnitude of the misalignment of the head relative to the video track;

altering the phase of the capstan drive signal by a discrete phase increment when the error signal exceeds a predetermined level so as to improve the alignment between the video track and the head; and terminating the dithering of the tape in response to the error signal being reduced below the predetermined level when the track is substantially aligned with the read head.

2. A method as set forth in claim 1 including the step of maintaining the altered phase of the capstan drive signal after dither is terminated so as to maintain the improved alignment between the video track and the head.

3. A method as set forth in claim 1 wherein said error signal has a polarity and magnitude representative of the direction and magnitude, respectively, of the misalignment of the head relative to the track and wherein the capstan drive signal is altered by a discrete phase increment to advance the tape when the error signal is of a first polarity and to retard the tape when the error signal is of a second polarity.

4. A method as set forth in claim 1 including the step of re-establishing the tape dither when the error signal exceeds said predetermined level.

5. In a videotape recorder having a videotape driven by a capstan receiving a capstan drive signal and having at least one video read head for generating an electrical signal representative of information recorded on video tracks on the tape, a method of detecting and correcting tracking errors between the video tracks and the video read head in a closed loop mode of operation and switching to an open loop mode of operation once the correction has been made so that, during the open loop mode, the audio reproduced from an audio track on the tape is not degraded, comprising:

dithering the videotape in the closed loop mode of operation so as to amplitude modulate the output of the video read head with a tracking signal representative of the position of the head with respect to a video track;

detecting the tracking signal and developing therefrom an error signal representative of the direction and magnitude of the misalignment of the head relative to the video track;

altering the phase of the capstan drive signal by a discrete phase increment when the error signal exceeds a predetermined level so as to improve the alignment between the video track and the head;

terminating the dithering of the tape and the closed loop mode of operation in response to the error signal falling below a predetermined level so that the tape is then driven in an open loop mode during which further tracking corrections are not made;

maintaining the altered phase of the capstan drive signal after dither is terminated so as to maintain the improved alignment between the video track and the head; and re-establishing the dither when the output of the read head indicates a loss of tracking and reverting to the closed loop mode of operation for further tracking corrections.

6. In a videotape recorder having a video-tape driven by a capstan receiving a capstain drive signal and having at least one video read head for generating an electrical signal representative of information recorded on video tracks on the tape, a method of detecting and correcting tracking errors between the video tracks and the video read head without substantially degrading audio reproduced from an audio track on the tape, comprising:

dithering the video tape to amplitude modulate the output of the video read head with a tracking signal representative of the position of the head with respect to a video track;

detecting the tracking signal and developing therefrom an error signal having a polarity and magnitude representative of the direction and magnitude, respectively, of the misalignment of the head relative to the track;

altering the phase of the capstan drive signal by a discrete phase increment when the error signal exceeds a predetermined level so as to advance the tape when the error signal is of a first polarity and to retard the tape when the error signal is of a second polarity;

terminating the dithering of the tape in response to the error signal falling below a predetermined level; and re-establishing the tape dither when the output of the read head indicates a loss of tracking.

7. In a videotape recorder having a videotape driven by a capstan receiving a capstan drive signal and having at least one video read head for generating an electrical signal representative of information recorded on video tracks on the tape, a method of detecting and correcting tracking errors between the video tracks and the video read head, without substantially degrading audio reproduced from a longitudinally oriented audio track on the tape, comprising:

generating a train of periodic control pulses having a repetition frequency equal to N times the frequency of the capstan drive signal; generating an error signal representative of the direction and magnitude of the misalignment of the head relative to a video track;

altering the pulse train by deleting a pulse therefrom when the error signal indicates misalignment between the head and the track in one direction and by adding a pulse to the pulse train when the error signal indicates misalignment between the head and the track in a second direction, stepping a divide-by-N divider with the altered pulse train to generate a capstan drive signal whose phase is altered by the addition and deletion of pulses to the pulse train so as to align a track on the tape with the video read head, and terminating the alteration of the pulse train when the error signal drops below a predetermined level.

8. A method as set forth in claim 7 including the step of maintaining the altered phase of the capstan drive signal after terminating the alteration of the pulse train so as to maintain the improved alignment between the video track and the head.

9. A method as set forth in claim 7 including generating a periodic clock signal whose frequency is less than the repetition frequency of the control pulses and altering the pulse train at a rate corresponding to the frequency of the clock signal.

10. A method as set forth in claim 7 including comparing the error signal to a first threshold voltage of a first polarity and generating an ADD signal when the error signal exceeds the first threshold voltage, and comparing the error signal to a second threshold voltage of a second polarity and generating a DELETE signal when the error signal exceeds the second threshold voltage, and deleting a pulse from the pulse train only when a DELETE signal is present and adding a pulse to the pulse train only when an ADD signal is present.

11. A method as set forth in claim 7 wherein N equals twenty.

12. A method as set forth in claim 7 wherein the error signal is generated by dithering the videotape to amplitude modulate the output of the video read head with a tracking signal representative of the position of the head relative to a video track and by detecting the tracking signal and developing therefrom the error signal.

13. A method as set forth in claim 12 including the step of terminating the dither when the error signal falls below a predetermined amplitude.

14. A method as set forth in claim 12 wherein the tracking signal is amplitude modulated at the dither frequency and wherein the error signal is derived from the tracking signal by applying the tracking signal to an amplifier having an inverting mode and a non-inverting mode and by alternately switching the amplifier between its inverting mode and its non-inverting mode at a rate equal to the dither frequency so that the amplifier inverts every other half cycle of the tracking signal and produces at its output the error signal having a first polarity when a track and the read head are misaligned in one direction and a second opposite polarity when the track and the read head are misaligned in a second direction.

15. A method as set forth in claim 7 including generating a head speed signal representative of the rotational speed of the read head, deriving from the head speed signal a reference signal whose frequency is equal to N times the frequency of the head speed signal, and generating the train of periodic control pulses from the reference signal.

16. A method as set forth in claim 15 including deriving from the reference signal a clock signal lower in frequency than the reference signal, and altering the pulse train at a rate corresponding to the frequency of the clock signal.

17. A method as set forth in claim 16 where the frequency of the clock signal is equal to one-tenth the frequency of the reference signal.

18. In a videotape recorder having a videotape driven by a capstan receiving a capstan drive signal and having at least one video read head for generating an electrical signal representative of information recorded on video tracks on the tape, a method of detecting and correcting tracking errors between the video tracks and the video read head in a closed loop mode of operation and switching to an open loop mode of operation once the correction has been made so that, during the open loop mode, the audio reproduced from an audio track on the tape is not degraded, comprising:
generating a train of periodic control pulses having a repetition frequency equal to N times the frequency of the capstan drive signal;
generating, in the closed loop mode of operation, an error signal representative of the direction and magnitude of the misalignment of the head relative to a video track;
altering the pulse train by deleting a pulse therefrom when the error signal indicates misalignment between the head and the track in one direction and by adding a pulse to the pulse train when the error signal indicates misalignment between the head and the track in a second direction;
stepping a divide-by-N divider with the altered pulse train to generate a capstan drive signal whose phase is altered by the addition and deletion of pulses to the pulse train so as to align a track on the tape with the video read head;
terminating altering the pulse train and the closed loop mode of operation when the error signal drops below a predetermined level so that the tape is then driven in an open loop mode during which further tracking corrections are not made;
maintaining the altered phase of the capstan drive signal during the open loop mode of operation so as to maintain the improved alignment between the video track and the head; and
re-establishing the closed loop mode of operation, including generation of the error signal and alteration of the pulse train, when the output of the read head indicates a loss of tracking.

19. In a videotape recorder having a video-tape driven by a capstan receiving a capstan drive signal and having at least one video read head for generating an electrical signal representative of information recorded on video tracks on the tape, a method of detecting and correcting tracking errors between the video tracks and the video read head without substantially degrading audio reproduced from an audio track on the tape, comprising:
generating a train of periodic control pulses having a repetition frequency equal to N times the frequency of the capstan drive signal;
generating an error signal by dithering the videotape to amplitude modulate the output of the video read head with a tracking signal representative of the position of the head relative to a video track and by detecting the tracking signal and developing therefrom the error signal;
altering the pulse train by deleting a pulse therefrom when the error signal indicates misalignment between the head and the tracks in one direction and by adding a pulse to the pulse train when the error signal indicates misalignment between the head and the track in a second direction;
stepping a divide-by-N divider with the altered pulse train to generate a capstan drive signal whose phase is altered by the addition and deletion of pulses to the pulse train so as to align a track on the tape with the video read head;
terminating the dither and the alteration of the pulse train when the error signal drops below a predetermined level; and
re-establishing the tape dither when the output of the video read head indicates a loss of tracking.

20. A method as set forth in claim 19 including comparing the error signal to a first threshold voltage of a first polarity and generating an ADD signal when the error signal exceeds the first threshold voltage, and comparing the error signal to a second threshold voltage of a second polarity and generating a DELETE signal when the error signal exceeds the second threshold voltage, and deleting a pulse from the pulse train only when a DELETE signal is present and adding a pulse to the pulse train only when an ADD signal is present.

21. A method as set forth in claim 19 including the step of maintaining the altered phase of the capstan drive signal after dither is terminated so as to maintain the improved alignment between the video track and the head.

22. For use in a videotape recorder having a videotape driven by a capstan receiving a capstan drive signal and having at least one video read head for generating an electrical signal representative of information recorded on video tracks on the tape, a system for detecting and correcting tracking errors between the video tracks and the video read head without substantially degrading audio reproduced from an audio track on the tape, comprising:

means for dithering the video tape to amplitude modulate the output of the video read head with a tracking signal representative of the position of the head with respect to a video track;

means for detecting the tracking signal and developing therefrom an error signal representative of the direction and magnitude of the misalignment of the head relative to the video track;

means for altering the phase of the capstan drive signal by a discrete phase increment when the error signal exceeds a predetermined level; and means for terminating the dithering of the tape in response to the error signal being reduced below the predetermined level when the track is substantially aligned with the read head.

23. A system as set forth in claim 22 wherein said error signal has a polarity and a magnitude representative of the direction and magnitude, respectively, of the misalignment of the head relative to the track and including means responsive to the alteration of the phase of the capstan drive signal for advancing the tape when the error signal is of a first polarity and for retarding the tape when the error signal is of a second polarity.

24. For use in a videotape recorder having a videotape driven by a capstan receiving a capstan drive signal and having at least one video read head for generating an electrical signal representative of information recorded on video tracks on the tape, a system for detecting and correcting tracking errors between the video tracks and the video read head in a closed loop mode of operation and switching to an open loop mode of operation once the correction has been made so that, during the open loop mode, the audio reproduced from an audio track on the tape is not degraded, comprising:

means for dithering the video tape in the closed loop mode of operation so as to amplitude modulate the output of the video read head with a tracking signal representative of the position of the head with respect to a video track;

means for detecting the tracking signal and developing therefrom an error signal representative of the direction and magnitude of the misalignment of the head relative to the video track;

means for altering the phase of the capstan drive signal by a discrete phase increment when the error signal exceeds a predetermined level so as to improve the alignment between the video track and the head;

means responsive to the error signal for terminating the dithering of the tape and the closed loop mode of operation when the error signal falls below a predetermined level that indicates the video track is substantially aligned with the read head so that the tape is then driven in an open loop mode during which further tracking corrections are not made;

means for maintaining the altered phase of the capstan drive signal after dither is terminated so as to maintain the improved alignment between the video track and the head; and means for re-establishing the dither when the output of the read head indicates a loss of tracking so as to revert to the closed loop mode of operation for further tracking corrections.

25. In a videotape recorder having a videotape driven by a capstan receiving a capstan drive signal and having at least one video read head for generating an electrical signal representative of information recorded on video tracks on the tape, a system for detecting and correcting tracking errors between the video tracks and the video read head without substantially degrading audio reproduced from an audio track on the tape, comprising:

means for generating a train of periodic control pulses having a repetition frequency equal to N times the frequency of the capstan drive signal;

means for generating an error signal representative of the direction and magnitude of the misalignment of the head relative to a video track;

means for altering the pulse train by deleting a pulse therefrom when the error signal indicates misalignment between the head and the track in one direction and by adding a pulse to the pulse train when the error signal indicates misalignment between the head and the track in a second direction;

means for stepping a divide-by-N divider with the altered pulse train to generate a capstan drive signal whose phase is altered by the addition and deletion of pulses to the pulse train so as to align the track with the video read head; and means for terminating the alteration of the pulse train when the tracking error signal drops below a predetermined level.

26. A system as set forth in claim 25 wherein said means for generating an error signal includes means for dithering the videotape to amplitude modulate the output of the video read head with a tracking signal representative of the position of the head relative to a video track and means for detecting the tracking signal and developing therefrom the error signal.

27. A system as set forth in claim 26 including means for terminating the dither when the error signal falls below a predetermined amplitude and means for re-establishing the dither when the output of the video read head indicates a loss of tracking.

28. In a videotape recorder having a videotape driven by a capstan receiving a capstan drive signal and having at least one video read head for generating an electrical signal representative of information recorded on video tracks on the tape, a system for detecting and correcting tracking errors between the video tracks and the video read head without substantially degrading audio reproduced from an audio track on the tape, comprising:

a voltage controlled oscillator receiving a head speed signal indicative of the rotational speed of the head and generating a reference signal whose frequency is equal to N times the frequency of the capstan drive signal;

a pulse generating circuit receiving the reference signal and generating a train of control pulses having a repetition frequency equal to the frequency of the reference signal;

means for dithering the tape to generate an error signal representative of the direction and magnitude of the misalignment of the head relative to a video track;

means receiving the error signal for comparing it to a first threshold voltage of a first polarity and generating an ADD signal when the error signal exceeds the first threshold voltage, and comparing the error signal to a second threshold voltage of a second polarity and generating a DELETE signal when the tracking error signal exceeds a second threshold voltage;

circuit means responsive to said ADD signal for altering the train of pulses by adding a pulse to the train of control pulses only when an ADD signal is generated;

circuit means responsive to said DELETE signal for altering the train of pulses by deleting a pulse from the train of control pulses only when a delete signal is generated;

a divide-by-N divider receiving the altered train of pulses for generating a capstan drive signal whose phase is altered by the addition and deletion of pulses to the pulse train so as to align a track on the tape with the video read head;

means for terminating the dither of the tape when the tracking error signal drops below said first and second threshold voltages; and means for re-establishing the tape dither when the output of the video read head indicates a loss of tracking.

29. A system as set forth in claim 28 wherein dithering the tape amplitude modulates the output of the video read head with a tracking signal representative of the instantaneous position of the head relative to a track, and including means for detecting the tracking signal and converting it to the error signal.

30. A system as set forth in claim 29 wherein the tracking signal is converted to the error signal by means comprising an amplifier having an inverting input and a noninverting input, said amplifier receiving the tracking signal at both of said inputs, and means for grounding one of said inputs at a rate equal to the dither frequency such that the amplifier inverts every other half cycle of the tracking signal and produces at its output the error signal having a first polarity when the track and the read head are misaligned in one direction and a second opposite polarity when the track and the read head are misaligned in a second direction.

31. For use in a system in which a transducer is aligned with a recording medium for sensing information recorded thereon and in which relative motion between the transducer and the recording medium is controlled by a variable phase drive signal, a method of controlling the alignment between the transducer and the recording medium comprising:

fluctuating the position of the transducer relative to the recording medium at a constant frequency to modulate the output of the transducer with a tracking signal representative of the position of the transducer with respect to the recording medium;

detecting the tracking signal and developing therefrom an error signal representative of the direction and magnitude of the misalignment of the transducer relative to the recording medium;

altering the phase of the drive signal by at least one discrete phase increment when the error signal exceeds a predetermined level so as to improve the alignment between the transducer and the recording medium; and terminating the fluctuation of the position of the transducer relative to the recording medium in response to the error signal being reduced below the predetermined level when the transducer is substantially aligned with the recording medium.

32. For use in a system in which a transducer is aligned with a recording medium for sensing information recorded thereon, and in which relative motion between the transducer and the recording medium is controlled by a variable phase drive signal, a method of controlling the alignment between the transducer and the recording medium, comprising:

generating a train of periodic control pulses having a repetition frequency equal to N times the frequency of the drive signal;

generating an error signal representative of the direction and magnitude of the misalignment of the transducer relative to the recording medium;

altering the pulse train by deleting a pulse therefrom when the error signal indicates misalignment between the transducer and the recording medium in one direction and by adding a pulse to the pulse train when the error signal indicates misalignment between the transducer and the recording medium in a second direction;

stepping a divide-by-N divider with the altered pulse train to generate a drive signal whose phase is altered by the addition and deletion of pulses to the pulse train so as to align the transducer with the recording medium; and terminating the alteration of the pulse train when the error signal drops below a predetermined level.

* * * * *